United States Patent [19]

Okada et al.

[11] 4,434,128
[45] Feb. 28, 1984

[54] METHOD AND APPARATUS FOR STRETCHING THERMOPLASTIC POLYMER FILMS

[75] Inventors: Tokio Okada; Shigezo Kojima; Haruhisa Tani; Kazuhiko Kurihara, all of Tokyo; Hirosi Yazawa, Kunitachi, all of Japan

[73] Assignees: Nippon Petrochemicals Co., Ltd; Polymer Processing Research Institute, Ltd., both of Tokyo, Japan

[21] Appl. No.: 362,844

[22] Filed: Mar. 29, 1982

[30] Foreign Application Priority Data

Apr. 1, 1981 [JP] Japan .................................. 56-48797

[51] Int. Cl.³ .............................................. B29D 7/24
[52] U.S. Cl. ....................................... 264/560; 26/72; 26/81; 26/82; 264/160; 264/209.5; 264/289.6; 264/290.2
[58] Field of Search .......... 264/290.2, 235.8, DIG. 73, 264/560, 563, 565, 160, 209.5, 289.6; 26/72, 81, 82, 83

[56] References Cited

U.S. PATENT DOCUMENTS

| | | | |
|---|---|---|---|
| 2,582,165 | 1/1952 | Rosenfeld | 264/DIG. 73 |
| 2,635,065 | 4/1953 | Nashley | 26/72 X |
| 2,895,171 | 7/1959 | Holmes-Walker et al. | 264/DIG. 73 |
| 3,387,448 | 6/1968 | Lathem et al. | 264/290.5 |
| 3,444,585 | 5/1969 | Watanabe | 264/290.2 X |
| 3,448,529 | 6/1969 | Erspamer et al. | 26/72 X |
| 3,581,344 | 6/1971 | Sederlund et al. | 264/290.2 X |
| 3,945,093 | 3/1976 | Larsen et al. | 26/72 X |
| 4,331,624 | 5/1982 | Yazawa et al. | 264/290.2 X |
| 4,349,500 | 9/1982 | Yazawa et al. | 264/290.2 X |

FOREIGN PATENT DOCUMENTS

| | | |
|---|---|---|
| 16653 | 10/1980 | European Pat. Off. . |
| 27735 | 4/1981 | European Pat. Off. . |
| 61931 | 10/1982 | European Pat. Off. ......... 264/290.2 |
| 1223486 | 2/1971 | United Kingdom . |

Primary Examiner—Donald E. Czaja
Assistant Examiner—James C. Housei
Attorney, Agent, or Firm—Bucknam and Archer

[57] ABSTRACT

A method and apparatus for stretching a thermoplastic polymer film in which the opposite selvages of the film are gripped by gripping means and are stretched transversely during heating by moving the selvages along two divergent arcuate paths lying in the same plane and extending over a predetermined circumferential range from a quater to a half of the full circumference of the circle containing the arcuate paths. In order to avoid drawbacks in the existing equipment such as irregular molecular orientation in and rupture of the film, the longitudinal travel of the film while being stretched is controlled by controlling means so that the central web portion is advanced by substantially the same distance as the gripped film selvages, whereby the amound of longitudinal movement of the film is held always constant throughout the width of the film.

5 Claims, 4 Drawing Figures

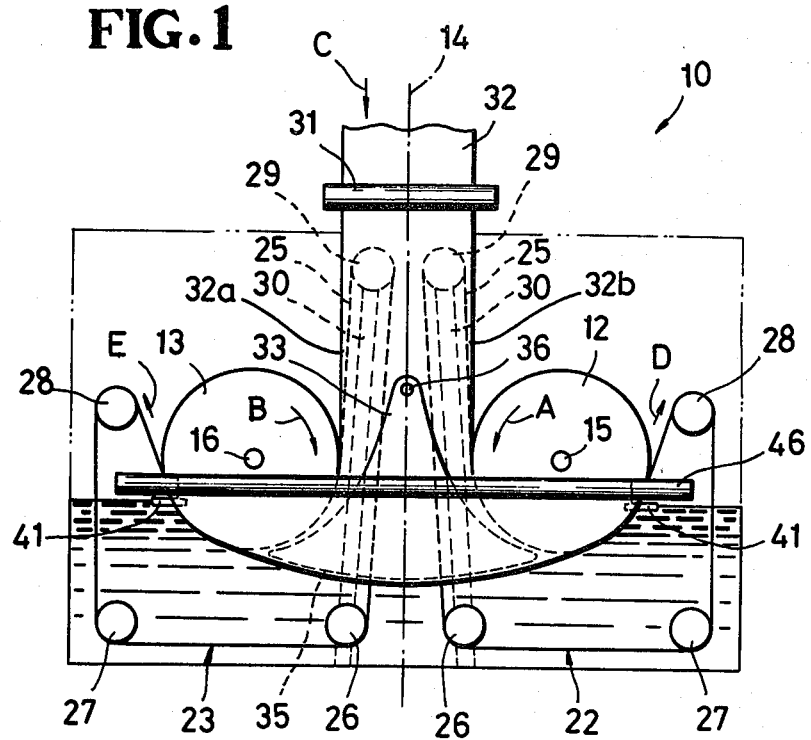
FIG. 1
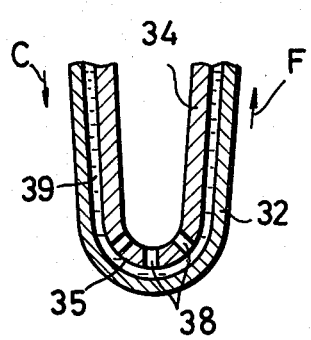
FIG. 3
FIG. 4

METHOD AND APPARATUS FOR STRETCHING THERMOPLASTIC POLYMER FILMS

BACKGROUND OF THE INVENTION

1. Field of the Invention

The present invention relates to a method of and an apparatus for stretching a thermoplastic polymer film monoaxially in a transverse direction or biaxially in longitudinal and transverse directions at the same time, if desired.

2. Prior Art

There have been proposed methods of stretching a thermoplastic polymer film in which the film is gripped along its opposite selvages between a pair of substantially coplanar pulleys rotating in opposite directions and a pair of endless belt means respectively trained arcuately around the pulleys, and then stretched transversely by moving the gripped film selvages, respectively, along a pair of divergent substantially semicircular arcuate paths formed, respectively, around the pulleys while it is heated. The film is reversed in direction of travel during movement of the gripped selvages along the arcuate paths. Such methods are described in copending U.S. patent application Ser. No. 133,146 filed Mar. 24, 1980 and Ser. No. 196,121 filed Oct. 10, 1980, respectively, which have been assigned to the present assignees. Such proposed methods suffer from the drawback that the distance of longitudinal movement of the film while being stretched varies or differs widthwise of the film between the selvages and the central web portion thereof. The maximum difference in distance (d) of movement is theoretically represented by the formula $d_{max} = r(\pi - 2)$ (where r is the radius of the pulley). However, departures in excess of the theoretical maximum value have been observed in practice because, under longitudinal contractive stresses created during lateral stretching of the film, the unsupported central web portion of the film tends to be distorted where the film is reversed in its direction of travel, i.e. the film material of that portion tends to take a short-cut by turning about a nearly chevron-shaped line at the place of reversal instead of turning about a tangential line common to the two pulleys on their farthermost sides. The stretched film is irregular in molecular orientation particularly in the longitudinal direction thereof and has varying strength in different directions.

SUMMARY OF THE INVENTION

It is therefore an object of the present invention to provide a method of and an apparatus for stretching a thermoplastic polymer film which will reduce or eliminate the foregoing drawback of the prior art.

Another object of the present invention is to provide a method and apparatus for manufacturing a film stretched transversely with uniform molecular orientation.

According to a first aspect of the present invention, there is provided a method of stretching a thermoplastic polymer film, comprising the steps of feeding the film in a longitudinal direction; gripping the film along its opposite selvages; moving the gripped film selvages respectively along a pair of divergent arcuate paths lying substantially in the same plane and each extending over a predetermined circumferential range from approximately a quarter to approximately a half of the full circumference of a circle containing the arcuate path, whereby the film is stretched transversely and is reversed in its direction of travel substantially opposite to said longitudinal direction during movement of the gripped film selvages along the respective arcuate paths; controlling the longitudinal travel of the film while being stretched so that the central web portion of the film between the gripped film selvages is advanced by substantially the same distance as the gripped film selvages, whereby the amount of longitudinal movement of the film is held always constant throughout the width of the film; heating the film during the transverse stretching thereof; and releasing the stretched film for cooling to set.

According to a second aspect of the present invention, there is provided an apparatus for stretching a thermoplastic polymer film, comprising means for feeding the film in a longitudinal direction; means for gripping the film along opposite selvages thereof and for moving the gripped film selvages respectively along a pair of divergent arcuate paths lying substantially in a common plane and each extending over a predetermined circumferential range from approximately a quarter to approximately a half of a circle containing the arcuate path, whereby the film is stretched transversely and is reversed in its direction to travel substantially opposite to said longitudinal direction during movement of the gripped selvages along the respective arcuate paths; means for controlling the longitudinal travel of the film while being stretched so that the central web portion of the film between the film selvages is advanced by substantially the same distance as the gripped selvages, whereby the amount of longitudinal movement of the film is held always constant throughout the width of the film; means for heating the film during the stretching thereof; and means for withdrawing the stretched film for cooling to set.

Many other advantages, features and additional objects of the present invention will become manifest to those versed in the art upon making reference to the detailed description and the accompanying drawings in which two preferred embodiments incorporating the principles of the present invention are shown by way of illustrative example.

BRIEF DESCRIPTION OF THE DRAWINGS

FIG. 1 is a schematic front elevational view of an apparatus constructed in accordance with the present invention;

FIG. 3 is an enlarged cross-sectional detail view of the portion encircled by dash-and-dot line I in FIG. 2; and FIG. 4 is a front elevational view with part in cross section of a film guide roller according to another embodiment of the present invention.

DETAILED DESCRIPTION

Figure 2:
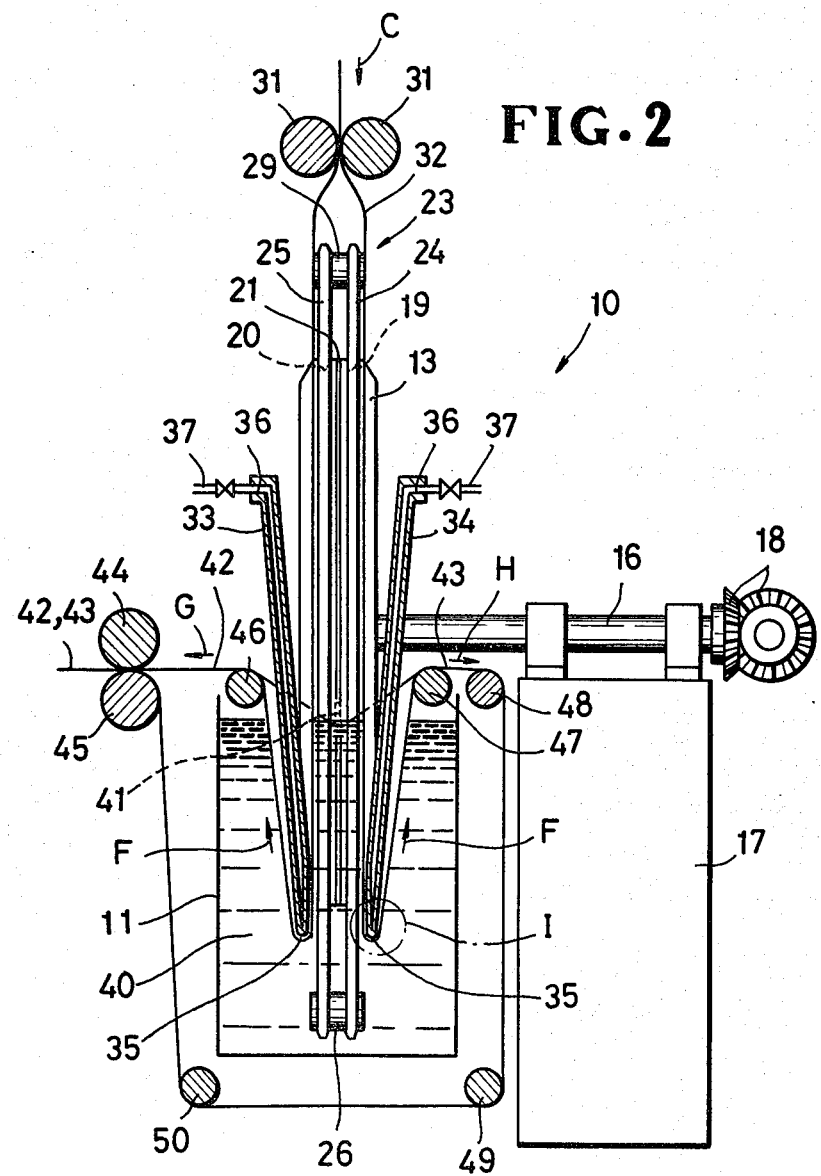
FIG. 2 is an enlarged transverse cross-sectional view of the apparatus shown in FIG. 1.

As shown in FIGS. 1 and 2, an apparatus 10 for stretching tubular films comprises a housing or container 11 and a pair of coplanar pulleys 12,13 of substantially the same dimensions disposed symmetrically in horizontal alignment across a vertical reference center line 14 (FIG. 1) and mounted respectively on a pair of horizontal shafts 15,16 rotatably supported on a rack 17 (FIG. 2) and coupled through a gear train 18 (FIG. 2) to an appropriate drive source such as a motor (not shown), which upon energization causes the pulleys 12,13 to rotate in opposite directions as indicated by the arrows A and B in FIG. 1, counterclockwise and clockwise, respectively at the same peripheral speed. Although the pulleys 12,13 are shown to rotate in a substantially vertical common plane, they may be arranged to rotate in a plane that may be anywhere between vertical and horizontal.

Each of the pulleys 12,13 has a pair of parallel peripheral grooves 19,20 of substantially V-shaped cross section (FIG. 2) and a central peripheral groove 21 (FIG. 2) disposed between the groove 19,20.

A pair of endless belt means 22,23 is trained around the pulleys 12,13, respectively, in symmetrical relation with respect to the vertical reference line 14. Each of the endless belt means 22,23 comprises a pair of parallel V belts 24,25 received respectively in the peripheral grooves 19,20 of one of the pulleys 12,13 and guided around idle rollers 26,27,28 and 29 that are rotatably supported in the housing 11. The rollers 26–29 are arranged in such a manner that the belts 24,25 trained therearound are held in engagement with each of the pulleys 12,13 substantially through a lower, substantially semicircular peripheral edge thereof. The rollers 29,29 are disposed substantially in vertical alignment with the rollers 26,26, respectively in vertically spaced relation thereto, the rollers 29,29 being located upwardly of the pulleys 12,13. A pair of columns 30,30 (FIG. 1) extends upwardly from the bottom of the housing 11 and supports the rollers 29,29, respectively, on upper ends thereof. A piping (not shown) is mounted on the vertical columns 30,30 for introducing live steam into the housing 11.

A pair of horizontal pinch rollers 31,31 is disposed upwardly of the housing 11 for feeding a tubular film 32 in flattened form down a longitudinal path extending along the vertical reference line 14.

A pair of fan-shaped hollow guide members 33,34 is disposed centrally in the housing 11 one on each side of the pulleys 12,13. Each of the guide members 33,34 has on its periphery an upwardly concaved or downwardly convex guide surface 35 of U-shaped cross section which extends arcuately between the pulleys 12,13 substantially in circumscribing relation thereto and terminates near the lowermost edges of the respective pulleys 12,13, the vertical reference line 14 passing through the middle point of the peripheral guide surface 35. Each of the guide members 33,34 has at its upper end an opening 36 coupled through a piping 37 (FIG. 2) to a source of pressurized hot fluid (not shown) for introducing a hot fluid such as hot water or steam into the interior of the guide member at an increased pressure. As shown in FIG. 3, each guide member 33,34 further has a number of perforations 38 opening to the guide surface 33,35 and adapted to discharge pressurized hot water or steam therethrough onto the tubular film 32 while being reversed in direction of travel around the guide surface 35,35.

The tubular film 32 is fed downwardly in the direction of the arrow c by the pinch rollers 31,31 at a first speed toward a space between the pulleys 12,13. As the film 32 progresses, it envelops the rollers 29,29 and the vertical runs of the V belts 24,25 and 24,25, which are positioned upwardly of the pulleys 12,13, whereupon the film 32 is supported at its opposite edges or selvages 32a,32b by said vertical runs of the V belts. The selvages 32a,32b are progressively pressed by the V belts 24,25 and 24,25 from inside the tubular film 32 against peripheries of the pulleys 12,13, which are rotated in the directions of the arrows A and B, respectively, at a peripheral speed equal to, or if bidirectional stretching is desired, greater than the first speed of feed of the film 32. Rotation of the pulleys 12,13 causes the film selvages 32a,32b to be progressively gripped tightly between the pulleys 12,13 and the V belts 24,25 and 24,25 running in the directions of the arrows D and E, respectively, and advanced along a pair of divergent arcuate paths, respectively, that correspond to the lower semicircular peripheral edges of the pulleys 12,13. The film 32 is stretched transversely as the film selvages 32a,32b are carried by the pulleys 12,13 progressively away from each other. In case the pulleys 12,13 rotate faster at their peripheries than the speed of feed of the film 32, the film 32 is stretched bidirectionally or longitudinally and transversely at the same time. During that time, the film 32 moves downwardly until the selvages 32a,32b and the central portion between them reach, respectively, the lowermost edges of the pulleys 12,13 and the peripheral guide surfaces 35,35 of the guide members 33,34 where the film 32 is turned inside out, and then is reversed in direction of travel or begins to move upwardly as indicated by the arrow F (FIGS. 2 and 3) after the selvages 32a,32b and the central portion have gone past the lowermost edges and the peripheral guide surfaces, respectively. The peripheral guide surfaces 35,35 have a radius of curvature so set as to maintain the amount of longitudinal movement of the film 32 constant throughout the width thereof during the stretching of the film 32; if not so, the film 32 would become wavy or irregular in molecular orientation. During the stretching of the film 32, hot water or steam is ejected from the guide members 33,34 through the perforations 38 and impinges upon the opposite surfaces of the flattened tubular film 32 to form a pair of U-shaped lubricant layers 39 (FIG. 3) between the guide surfaces 35,35 and the opposite film surfaces, respectively, to thereby reduce friction therebetween.

The housing 11 includes at its lower portion a bath 40 of hot water at a temperature of 100° C. or less in which substantially lower halves of the pulleys 12,13 below the shafts 15,16 are immersed for heating the tubular film 32 as it is stretched. Before the film 32 enters the hot water bath 40, the film is uniformly heated with live steam introduced at a pressure of 60–120 mm in terms of a water column through the piping on the vertical columns 30,30 into the tubular film 32, which is thereby spread around the vertical runs of the V belts 24,25 below the rollers 29,29. With the film 32 thus heated and spread, the film 32 is prevented from lateral shrinkage or necking which would otherwise occur before arriving at the pulleys 12,13 due to longitudinal stretching of the film 32, and displace the vertical runs of the V belts 24,25 and 24,25 toward each other. The discharged live steam is sealed within the tubular film 32 by the pinch rollers 31,31 and the hot water bath 40 against leakage or loss of steam.

The stretched film 32 is cut along the selvages 32a,32b by a pair of cutter blades 41,41 into a pair of severed sheets 42,43. The cutter blades 41,41 extend in the pulleys 12,13, respectively, adjacent to a position at which the film 32 is released from the pulleys 12,13 and from the V belts 24,25 and 24,25. Therefore, the magnification of transverse stretch of the film 32 corresponds to the ratio of the distance between the cutter blades 41,41 to the width of the folded tubular film 32 minus the width of the selvages 32a,32b. Water or steam ejected from the guide members 33,34 is condensed into a pair of U-shaped grooves defined by the opposite film surfaces, respectively, and then overflows the grooves at the position just described above into the hot water bath 40, which is maintained in a constant level by means of a suitable level controller (not shown).

The sheets 42,43 are withdrawn in the same direction by a pair of horizontal withdrawal rollers 44,45 (FIG. 2) in such a way that they first move in opposite directions as indicated by the arrows G and H to pass over a pair of horizontal rollers 46,47, respectively, and then one 43 of them passes successively over idle rollers 48,49 and 50 (FIG. 2) in vertically surrounding relation to the housing 11 for being withdrawn by the withdrawal rollers 44,45 together with the other in superposed relation with each other. The withdrawal rollers 44,45 rotate at a peripheral speed substantially the same as or, if additional longitudinal stretch is desired, greater than the peripheral speed of the pulleys 12,13. The rollers 46,47 and other withdrawal means such as drums (not shown) over which the sheets 42,43 pass may be heated to heat set the sheets 42,43 for thermally stabilizing the same, or may be kept cold to render the sheets 42,43 heat-shrinkable at the time of use.

The tubular film 32 while being stretched longitudinally and transversely may be heated by a heating medium such as hot air, radient heat such as infrared radiation, dry steam, or the like instead of hot water.

FIG. 4 shows a modified guide member 51 in the shape of an axially elongated hollow "potbelly" barrel having in its cylindrical wall 52 a number of perforations 53 and coupled at opposite ends to a source of pressurized hot fluid (not shown). The wall 52 of barrel-shaped guide member 51 has a length and a radius of curvature substantially equal to those of the peripheral guide surfaces 35 of the fan-shaped guide members 33,34 so that when it is rotatably supported on the housing 11 in such a manner to assume one of the guide surfaces 35, the amount of longitudinal movement of the film 32 while being stretched can be maintained constant throughout the width of the film 32. A hot fluid such as hot water or steam ejected from the guide member 51 through the perforations 53 allows the film 32 to pass smoothly over and around the cylindrical wall 52 of the guide member 51.

From the foregoing description of two preferred embodiments, those skilled in the art will appreciate that the present invention is also applicable to thermoplastic polymer films in the form of a sheet instead of the tubular films described above, in which instance the film is reversed in direction of travel around one of the guide members 33 or 34 while it is stretched and is then withdrawn over one of rollers 46 or 47 by the withdrawal rollers 44,45. A plurality of superposed films can be stretched with water or other suitable separating agents placed therebetween to prevent thermal fusing of the superposed films.

EXAMPLE 1

To the apparatus 10 shown in FIGS. 1 and 2 was supplied an extruded tubular film of polyvinyl chloride having a thickness of 0.24 mm and a folded width of 560 mm at a speed of 10 m/min. through the pinch rollers 31,31. The film was gripped at its opposite selvages each 30 mm in width between the pulleys 12,13 and the V belts 24,25. The pulleys 12,13 having a diameter of approximately 750 mm and spaced 500 mm from each other were rotated at a peripheral speed of 40 m/min., and at the same time live steam was introduced into the tubular film. During movement of the gripped film selvages along the pair of divergent substantially semi-circular arcuate paths, the film was reversed in the direction of its travel smoothly around the guide surfaces 35 of the fan-shaped guide members 33,34 with the aid of steam injected over the tubular film through the perforations 38. After severance of the selvages, sheets of film were cooled on the cold rollers 46,46, respectively. The resulting transparent sheets were each 400% the original dimensions both longitudinally and transversely (which is 1600% of the original area) having a width of approximately 2 m and a thickness of 0.015 mm. The sheets were particularly suited for use in shrink packaging.

EXAMPLE 2

A melt-extruded, water-quenched tubular film of polypropylene having a thickness of 0.21 mm and a folded width of 600 mm was fed to the apparatus as shown in FIGS. 1 and 2 at a speed of 15 m/min. The tubular film was gripped and stretched in the same manner as in Example 1, except that the pulleys 13,14 were rotated at a peripheral speed 3 times as fast as the film was supplied to the apparatus and had a diameter of approximately 1000 mm. After severance of the selvages, there were obtained two sheets of film each stretched 300% longitudinally and 500% transversely having a width of approximately 2.5 m and a thickness of 0.014 mm. The stretched film sheet was particularly useful for shrink packaging. After further being thermally set on a hot drum heated at 145° C., the film sheet found wide use in general and packaging applications.

It is to be understood that the foregoing detailed description is given merely by way of illustration and that many variations may be made therein without departing from the spirit of our invention.

What is claimed is:

1. In a method of stretching a thermoplastic polymer film, comprising:
    (a) feeding the film in a longitudinal direction;
    (b) gripping the film along its opposite selvages;
    (c) moving the gripped selvages respectively along a pair of divergent arcuate paths lying substantially in the same plane and each extending over a predetermined circumferential range of from approximately a quarter to approximately a half of the full circumference of a circle containing the arcuate path, whereby the film is reversed in its direction of travel while being stretched; and
    (d) heating the film during its stretching; the improvement which comprises:
    (e) moving, a central web portion of the film between the gripped selvages, over a convex guide surface at the position where the film is reversed in its direction of travel, the convex guide surface having a radius of curvature capable of maintaining the amount of longitudinal movement of the film substantially constant across its width; and
    (f) providing a layer of a pressurized heating medium between the central web portion and the convex guide surface.

2. In an apparatus for stretching a thermoplastic polymer film comprising;
    (a) means for feeding the film in a longitudinal direction;
    (b) means for gripping the film along its opposite selvages and for moving the gripped selvages respectively along a pair of divergent arcuate paths lying substantially in the same plane and each extending over a predetermined circumferential range of from approximately a quarter to approximately a half of the full circumference of a circle containing the arcuate path, whereby the film is reversed in its direction of travel while being stretched; and (c) means for heating the film during its stretching; the improvement which comprises:

(d) a guide member disposed at the position where the film is reversed and having a convex guide surface over and around which a central web portion of the film between the gripped selvages is moved as the film is reversed in its direction of travel during its stretching, said convex guide surface having a radius of curvature capable of maintaining the amount of longitudinal movement of the film substantially constant across its width; and (e) means for providing a layer of a pressurized heating medium between the central web portion and said convex guide surface.

3. An apparatus according to claim 2, wherein said gripping and moving means comprises a pair of pulleys of substantially the same dimensions disposed symmetrically in horizontal alignment substantially in the same plane and rotatable at substantially the same peripheral speed but in opposite directions, each said pulley having at least one peripheral groove, and a pair of endless belts trained around the respective pulleys and engaging respectively in said peripheral grooves, said pulleys and said belts forming the pair of divergent arcuate paths and cooperating in gripping the opposite selvages of the film therebetween and in moving the selvages along the respective arcuate paths.

4. An apparatus according to claims 2 or 3, wherein said guide member comprises a fan-shaped hollow body defining on its periphery said convex guide surface, said fan-shaped hollow body having in its walls a number of perforations opening to said convex guide surface and an opening adapted to be coupled to a source of heating medium for forcing a heating medium onto the film through said perforations.

5. An apparatus according to claims 2 or 3, wherein said guide member comprises a rotatable barrel-shaped hollow body defining on its periphery said convex guide surface, said barrel-shaped hollow body having in its cylindrical wall a number of perforations opening to said convex guide surface and, in at least one end, an opening adapted to be coupled to a source of heating medium for injecting a heating medium onto the film through said perforations.

* * * * *